Sept. 20, 1966 W. E. CARPENTER 3,274,422
COLORED SEALED BEAM LAMP AND METHOD OF MAKING THE SAME
Filed May 6, 1963
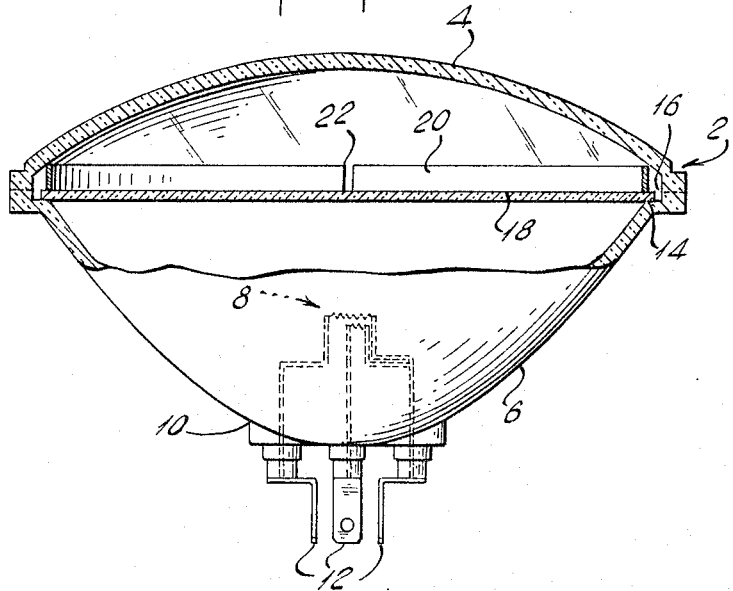
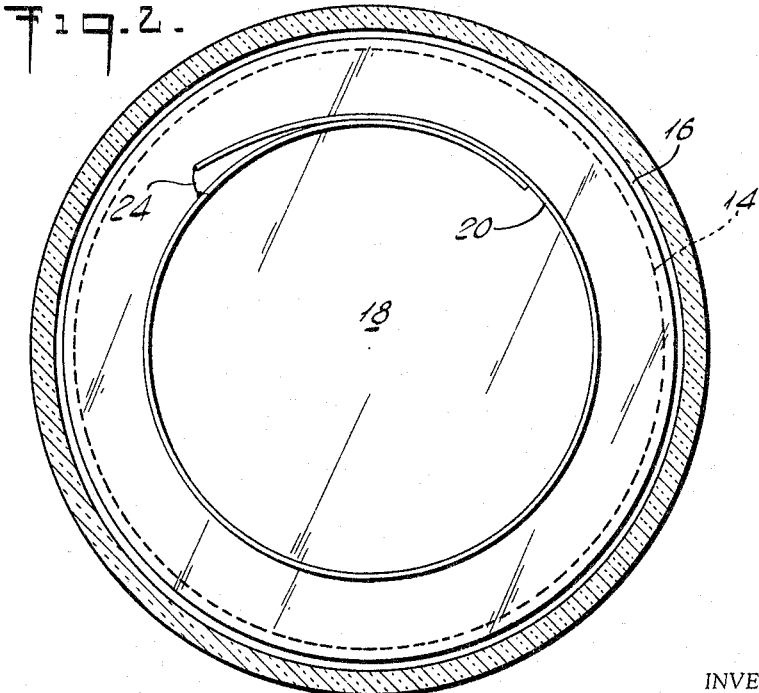
INVENTOR.
WALTER E. CARPENTER
BY
Eyre, Mann & Lucas
ATTORNEYS 3,274,422
COLORED SEALED BEAM LAMP AND METHOD
OF MAKING THE SAME
Walter E. Carpenter, Cedar Grove, N.J., assignor to Tung-Sol Industries, Inc., Newark, N.J., a corporation of Delaware
Filed May 6, 1963, Ser. No. 278,363
9 Claims. (Cl. 313—111)

The present invention relates to all glass sealed beam lamps and comprises a novel sealed beam lamp having a glass filter of any desired color mounted therein. The invention comprises also a novel method for mechanically mounting a soft glass filter plate within a hard glass enclosure which does not introduce strains in the glass walls of the enclosure, insures against contamination of the filaments, and is simple to practice.

There is a need in the automobile industry for colored sealed beam lamps, for example for directional or signal lamps for school buses, emergency vehicles or the like. Filters of suitable color are available in soft glass, but, because of the widely different coefficient of thermal expansion of the filter glass and the hard glass used for the lamp envelope, the filter cannot be fused to the envelope without introduction of excessive strains. The problem solved by applicant was thus to provide a sealed beam lamp having a filter so mechanically mounted therein that it would not shift in position when subjected to vibration experienced in a moving automobile and that would not require use of adhesive materials vaporization of which would contaminate the lamp filaments.

Applicant's solution of the problem involves the use of a strip of spring material so dimensioned that it fits between the inner surface of the lens and the adjacent flat surface of the soft glass filter when the glass filter is positioned on the inner rim of the hard glass reflector adjacent the sealing area. Prior to the sealing and exhausting operations, the spring strip is positioned on this filter while the filter rests on the rim of the reflector. At this time the strip is coiled into a substantially circular figure of a diameter substantially less than the inner diameter of the lamp seal and restrained in such circular form by a temporary link such as a fine tungsten filament of short length. After the lamp is sealed and exhausted, the link is broken, as by induction heating, releasing the spring strip which thereupon in attempting to straighten out wedges itself between the filter and reflector to hold the filter firmly in position.

For a better understanding of the invention and of the preferred embodiment thereof, reference may be had to the accompanying drawing, of which:

FIG. 1 is a vertical sectional view partly in elevation of a colored sealed beam lamp embodying the invention; and FIG. 2 is a top plan view showing the assembly of filter and spring positioned on the reflector prior to the sealing operation.

In FIG. 1 a sealed beam lamp 2 of invention is shown as having a conventional lens 4 of hard glass sealed about its periphery to a projecting rim of a conventional hard glass reflector 6 within which are the usual filaments 8 connected through the reflector base 10 to prong terminals 12.

As in conventional sealed beam lamp construction, the reflector is so shaped adjacent the sealing area that there is a flat ledge or inner rim 14 which, with the lens, provides an annual chamber 16 adjacent the seal. In accordance with the invention, a filter disc 18, of soft glass and of a desired color, say red, is disposed with its periphery overlying the ledge 14, firmly held thereon by a thin spring strip 20 of spring steel, phosphor bronze or the like. The strip 20 is of such width that the upper edge thereof engages the inner surface of the lens 4 in the neighborhood of the seal and is of such length that it forms substantially a complete circle in the completed lamp. In FIG. 1 the small gap between the ends of the strip is indicated at 22.

Prior to the sealing operation, to avoid loss of temper of the material of the spring strip 20 during heat sealing of the lens to the reflector and to avoid imbedding of the spring strip in the heat softened glass of the lens, the spring strip is coiled into a generally circular form of a diameter substantially less than that of the inner diameter of the seal and held in this position by a temporary link welded to one end of the spring strip and to an adjacent stretch of the strip. FIG. 2 shows the strip 20 in its restrained coiled form with a short link 24 interconnecting the outer end of the strip to an adjacent stretch thereof. Link 24 may be, for example, a short length of tungsten filament. In FIG. 2 the restrained strip is shown as positioned concentrically with the color filter disc 16 so that the entire strip is displaced inwardly from the sealing area.

After the lens has been positioned over the assembly of FIG. 2, the meeting rims of the lens and reflector are fused together and the enclosure evacuated and the exhaust tube tipped off in conventional manner. The link 24 is then induction heated through the envelope while the lamp is held with the filter disc horizontally disposed. The link, or a portion thereof, is thus vaporized removing the restraint on the spring strip which thereupon springs into the position shown in the completed lamp of FIG. 1. The metal vaporized from the link 24 during severing thereof, or particles of extraneous matter carried by the spring cannot reach the lamp filaments because of the interposition of the filter disc 18 and the amount of any such material is so small as to have a negligible effect upon the light emitted by the lamp, irrespective of where the vaporized metal deposits within the volume defined by the filter and lens.

This invention has now been described with specific reference to sealed beam headlamps of conventional construction having an annular seal between two hard glass members. Obviously the process of the invention could be employed wherever it is desired to support a plate mechanically within a glass enclosure without fusion of the plate to the enclosure. Also the invention could as readily be incorporated in lamps of different shape and size.

It is claimed:

1. A method for mechanically mounting a plate within a sealed glass enclosure with a spring member positioned between one side of the plate and the interior wall of the sealed glass enclosure so as to press the other side of the plate against the interior wall of the sealed glass enclosure comprising the steps of:
   (a) positioning the plate in the glass enclosure before the glass enclosure is sealed with the periphery of one side of the plate engaging the interior wall of the glass enclosure;
   (b) placing the spring member on the other side of the plate;
   (c) restraining the spring member in a compressed configuration wherein it is out of fixed engagement with the interior wall of the enclosure; and
   (d) removing the restraint on the spring member after the glass enclosure is sealed to allow the spring to expand into engagement with the interior wall of the enclosure.

2. The method of claim 1 wherein said restraint is effected by a metal link which is vaporized by induction heating.

3. A method for mechanically mounting a filter in the sealed envelope of a lamp by a strip of spring material curved in a substantialy circular form adjacent the edge of the filter with one edge of the strip against the interior wall of the envelope and the other edge of the strip against one side of the filter so as to press the other side of the filter against the interior of the wall of the sealed enclosure comprising the steps of:

(a) winding the strip of spring material into a coil whose diameter is too small to properly mount the filter in the envelope;

(b) restraining the strip of spring material in this coiled configuration by means of a link;

(c) positioning the filter and the restrained strip of spring material into the envelope before the envelope is sealed so that one edge of the strip faces one surface of the filter; and (d) vaporizing the link after the envelope is sealed allowing the coiled strip of spring material to expand.

4. A method for mechanically mounting a filter in between the reflector and lens of a sealed beam lamp with a strip of spring material curved in a substantially circular form with one edge of the strip against the interior wall of the lens and the other edge of the strip against one side of the filter so as to press the periphery of the other side of the filter against the interior wall of the reflector comprising the steps of:

(a) winding the strip of spring material into a coil whose diameter is too small to properly mount the filter in the envelope;

(b) restraining the strip of spring material in this coiled configuration with a metal link;

(c) positioning the filter and the restrained strip of spring material between the lens and the reflector prior to sealing the lamp so that the restrained strip of spring material is between the lens and the filter with one edge of the strip facing one side of the filter; and (d) vaporizing the link after the lamp is sealed to allow the coiled strip of spring material to expand.

5. The steps of claim 4 wherein said link is a thin metal wire which is vaporized by inductive heating.

6. A sealed beam lamp comprising:
(a) a reflector with a concave reflecting face;
(b) a filament positioned within the reflecting face;
(c) a lens positioned over the reflecting face to form an envelope surrounding the filament;
(d) a filter with two faces which is between the lens and the filament with the periphery of one of the faces positioned against the interior surface of the envelope; and
(e) a strip of spring material adjacent the periphery of the filter with one edge of the strip against the interior of the envelope and the other edge of the strip against the other face of the filter to hold the first mentioned face of the filter against the interior wall of the envelope.

7. A sealed beam lamp comprising:
(a) a reflector with a concave reflecting face and a ledge around the periphery of the reflecting surface;
(b) a filament positioned within the reflecting surface;
(c) a lens positioned over the reflecting face and joined to the reflector around the edge of the reflector to form a sealed enclosure for the filament;
(d) a filter disc between the lens and the filament with the periphery of one of the faces of the filter disc positioned against the ledge of the reflector; and
(e) a strip of spring material positioned around the filter disc with one edge of the strip against the interior surface of the lens and the other edge of the strip against the other face of the filter disc to hold the first mentioned face of the filter disc against the ledge around the periphery of the reflecting surface.

8. The structure of claim 7 wherein said filter disc is a soft colored glass filter.

9. The structure of claim 7 wherein said strip forms substantially a complete circle near the edge of the filter disc.

No references cited.

JAMES W. LAWRENCE, *Primary Examiner.*

P. C. DEMEO, *Assistant Examiner.*